(12) United States Patent
Kim et al.

(10) Patent No.: US 12,487,263 B2
(45) Date of Patent: Dec. 2, 2025

(54) UWB ANTENNA AND BLE ANTENNA PERFORMANCE TEST SYSTEM

(71) Applicant: AMOSENSE CO., LTD., Cheonan-si (KR)

(72) Inventors: Jungryul Kim, Cheonan-si (KR); Hyungil Baek, Cheonan-si (KR); Seho Lee, Cheonan-si (KR); Jaeil Park, Cheonan-si (KR); Hyunjoo Park, Cheonan-si (KR); Seungyeob Yi, Cheonan-si (KR); Jeonggeun Heo, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 194 days.

(21) Appl. No.: 18/293,029

(22) PCT Filed: Jul. 14, 2022

(86) PCT No.: PCT/KR2022/010270
§ 371 (c)(1),
(2) Date: Jan. 29, 2024

(87) PCT Pub. No.: WO2023/008790
PCT Pub. Date: Feb. 2, 2023

(65) Prior Publication Data
US 2024/0248126 A1     Jul. 25, 2024

(30) Foreign Application Priority Data

Jul. 27, 2021 (KR) .................. 10-2021-0098249

(51) Int. Cl.
*G01R 29/08* (2006.01)
*G01R 29/10* (2006.01)

(52) U.S. Cl.
CPC ..... *G01R 29/0871* (2013.01); *G01R 29/0892* (2013.01); *G01R 29/10* (2013.01)

(58) Field of Classification Search
CPC .............. G01R 29/0871; G01R 29/0892; G01R 29/10; G01R 29/105; G01R 29/0878; H04B 17/19; H04B 17/29; H04B 1/7163
See application file for complete search history.

(56) References Cited

U.S. PATENT DOCUMENTS 9,319,908 B2     4/2016  Nickel
2012/0053879 A1*  3/2012  Chang ................... H04B 17/12
                                               343/876

(Continued)

FOREIGN PATENT DOCUMENTS

CN     206686190 U      11/2017
KR     10-2015-0129752 A   11/2015
KR     10-2020-0144010 A   12/2020

OTHER PUBLICATIONS

EU European Extended Search Report dated Oct. 28, 2024 in application 22849766.5.

(Continued)

*Primary Examiner* — Alvaro E Fortich
(74) *Attorney, Agent, or Firm* — Maschoff Brennan

(57) ABSTRACT

Disclosed is an antenna performance test system for testing the performance of UWB and BLE antennas by reflecting a loss of a cable without changing test conditions. The disclosed antenna performance test system comprises a tester, which: responds to a first test mode setting signal so as to output, to a first antenna, a first test signal (a UWB band signal), and then generate a UWB communication performance measurement value based on a first response signal received from the first antenna and a second antenna with respect to the first test signal; and responds to a second test mode setting signal so as to output, to the first antenna, a (Continued)

second test signal(a BLE band signal), and then generate a BLE communication performance measurement value based on a second response signal received from the first antenna with respect to the second test signal.

16 Claims, 11 Drawing Sheets

(56) References Cited

U.S. PATENT DOCUMENTS

| | | | |
|---|---|---|---|
| 2014/0167794 A1* | 6/2014 | Nath | G01R 35/007 |
| | | | 324/750.02 |
| 2015/0177277 A1* | 6/2015 | Nickel | G01R 31/2822 |
| | | | 324/629 |
| 2018/0131596 A1* | 5/2018 | Huh | H04L 43/12 |
| 2020/0358469 A1* | 11/2020 | Oh | G16Y 20/30 |

OTHER PUBLICATIONS

Bahadir S. Yildiriim et al., "Integrated Bluetooth and UWB Antenna," IEEE Antennas and Wireless Propagation Letters, vol. 8, 2009.

* cited by examiner

UWB ANTENNA AND BLE ANTENNA PERFORMANCE TEST SYSTEM

TECHNICAL FIELD

The present disclosure relates to a system for testing performance of an antenna, and more particularly, to a system for testing performance of an antenna, which tests performance of a UWB antenna and a BLE antenna that are mounted on a mobile phone.

BACKGROUND ART

Various antennas, such as a Bluetooth low energy (BLE) antenna, an ultra-wide band (UWB) antenna, etc., are mounted on a mobile phone. The BLE antenna and the UWB antenna are used as antennas for measuring a distance from an object, the location of an object, the location of a mobile phone, etc.

A manufacturer tests performance of the BLE antenna and the UWB antenna in the development step or mass-production step of the mobile phone. An antenna performance test is performed through the transmission and reception of signals between a mobile phone, that is, a target to be measured, within a shield box, and the antenna (i.e., the BLE antenna or the UWB antenna) in the state in which the mobile phone and the antenna have been disposed.

In this case, the antenna that is disposed within the shield box in order to measure BLE communication performance or UWB communication performance of the mobile phone is connected to a test apparatus through an RF cable.

In a conventional system for testing performance of an antenna, however, the time taken to construct an antenna performance test environment is increased because a test environment needs to be changed depending on the antenna (i.e., BLE or UWB), that is, a test target, and thus the time taken for antenna performance is increased.

Furthermore, the conventional system for testing performance of an antenna has a problem in that an accurate antenna performance test is difficult because a loss attributable to the RF cable is not incorporated.

DISCLOSURE

Technical Problem

The present disclosure has been proposed by taking the aforementioned circumstances, and an object of the present disclosure is to provide a system for testing performance of a UWB antenna and a BLE antenna, which can test performance of a UWB antenna and a BLE antenna without changing a test environment.

Furthermore, another object of the present disclosure is to provide a system for testing performance of a UWB antenna and a BLE antenna, which tests antenna performance by incorporating a loss of a cable that is used upon the antenna performance test.

Technical Solution

In order to achieve the objects, a system for testing performance of a UWB antenna and a BLE antenna according to an embodiment of the present disclosure includes a first antenna disposed within a shield box in which a test target terminal is disposed and configured to receive a response signal output by the test target terminal, a second antenna disposed to be spaced apart from the first antenna within the shield box and configured to receive the response signal output by the test target terminal, and a tester configured to generate a UWB communication performance measurement value of the test target terminal based on first response signals for a first test signal, which are received from the first antenna and the second antenna, after outputting the first test signal that is a UWB band signal to the first antenna in response to an input of a first test mode setting signal and to generates a BLE communication performance measurement value of the test target terminal based on a second response signal for a second test signal, which is received from the first antenna, after outputting the second test signal that is a BLE band signal to the first antenna in response to an input of a second test mode setting signal.

Advantageous Effects

According to the present disclosure, the system for testing performance of a UWB antenna and a BLE antenna has an effect in that a loss of a cable that is used upon the antenna performance test can be easily measured by calculating the loss of the cable based on a difference between strength of an output signal of a signal generator and strength of a received signal of a tester.

Furthermore, the system for testing performance of a UWB antenna and a BLE antenna has an effect in that antenna performance into which a loss of a cable has been incorporated can be measured by setting a calculated loss of the cable as a correction value and incorporating the correction value into a measurement value that is measured upon the antenna performance test.

Furthermore, the system for testing performance of a UWB antenna and a BLE antenna has an effect in that it can improve the accuracy of the test results of antenna performance by measuring the antenna performance into which a loss of a cable has been incorporated.

Furthermore, the system for testing performance of a UWB antenna and a BLE antenna has effects in that an antenna performance test environment can be constructed at a cost smaller than a cost for the existing system for testing performance of an antenna and an antenna performance test environment can be constructed even in an experiment environment in which a power connection is difficult.

Furthermore, the system for testing performance of a UWB antenna and a BLE antenna has an effect in that performance of the UWB antenna and BLE antenna of a test target terminal can be measured without changing a test environment.

Furthermore, the system for testing performance of a UWB antenna and a BLE antenna has an effect in that performance of the BLE antenna of a test target terminal can be more precisely measured because the power level of a transmission signal and strength of a received signal can be precisely measured unlike in a conventional technology in which only a PER is measured upon BLE antenna performance measurement.

MODE FOR INVENTION

Figure 1:
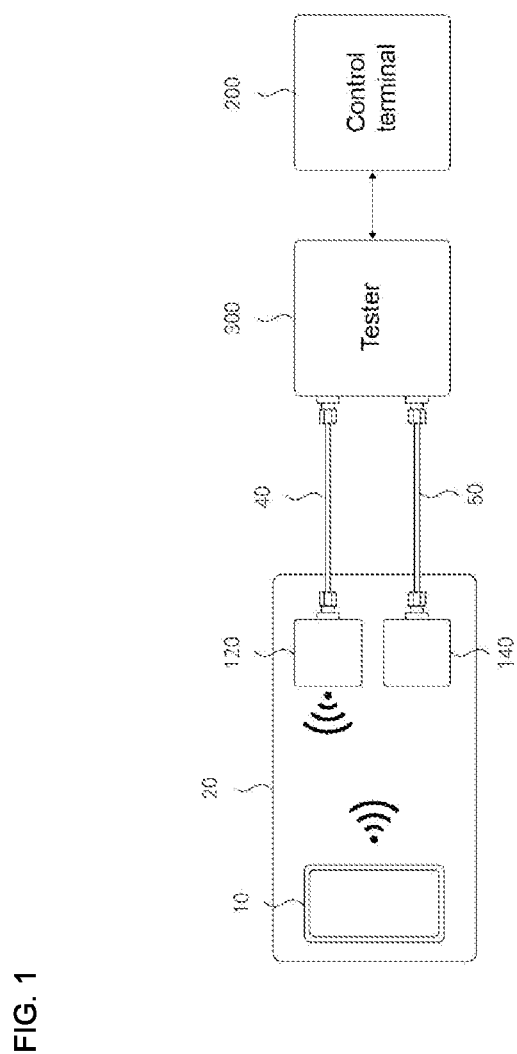
FIG. 1 is a diagram for describing a system for testing performance of a UWB antenna and a BLE antenna according to an embodiment of the present disclosure.

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are displayed in different drawings. Further, in describing the present disclosure, when it is determined that the detailed description of the related well-known configuration or function may obscure the gist of the present disclosure, the detailed description thereof will be omitted.

A system for testing performance of a UWB antenna and a BLE antenna according to an embodiment of the present disclosure is an apparatus for measuring UWB communication performance and BLE communication performance of a test target terminal. The system for testing performance of an antenna measure a loss of an RF cable that is used upon performance test of a test target terminal and outputs a performance measurement value into which the measured loss of the RF cable has been incorporated. Accordingly, the system for testing performance of an antenna can accurately measure UWB communication performance and BLE communication performance of the test target terminal.

Referring to FIG. 1, the system for testing performance of a UWB antenna and a BLE antenna (hereinafter an antenna performance test system) is constructed to include a first antenna 120, a second antenna 140, a control terminal 200, and a tester 300.

The first antenna 120 is disposed within the same shield box 20 as a test target terminal 10, and is connected to the tester 300 through a first RF cable 40. The first antenna 120 transmits and receives a signal having a UWB frequency band and a signal having a BLE frequency band. That is, when the mode of the tester 300 is set as a first test mode, the first antenna 120 transmits a first test signal having the UWB frequency band to the test target terminal 10, and receives a first response signal for the first test signal from the test target terminal 10. When the mode of the tester 300 is set as a second test mode, the first antenna 120 transmits the second test signal having the BLE frequency band to the test target terminal 10, and receives a second response signal for the second test signal from the test target terminal 10.

The second antenna 140 is disposed within the same shield box 20 as the test target terminal 10, and is connected to the tester 300 through a second RF cable 50. The second antenna 140 is disposed to be spaced apart from the first antenna 120 at a predetermined interval within the shield box 20. The second antenna 140 transmits and receives the first response signal, that is, a signal having a UWB frequency band, which is output by the test target terminal 10.

The control terminal 200 is a terminal that controls the tester 300 for an antenna performance test. The control terminal 200 may include a terminal, such as a smartphone, a tablet, or a desktop, which may control the tester 300. The control terminal 200 is connected to the tester 300 so that data communication is possible, and is connected to the tester 300 through a communication cable, such as a serial cable or a USB cable, for example. In this case, the control terminal 200 may be connected to a network, such as the Internet or Intranet, in order to transmit performance test results to a terminal or a server that is disposed outside a test room.

The control terminal 200 outputs a control signal for operating the tester 300 in a correction mode. That is, when a manager requests entry into the correction mode through the control terminal 200, in response to the request for the entry into the correction mode, the control terminal 200 generates a correction mode setting signal and outputs the correction mode setting signal to the tester 300. In this case, the correction mode is a mode in which a correction value is set through the measurement of a loss of a cable, for example.

The control terminal 200 outputs a control signal for operating the tester 300 in a test mode. That is, when a manager requests entry into the test mode through the control terminal 200, in response to the request for the entry into the test mode from the manager, the control terminal 200 generates a test mode setting signal and outputs the test mode setting signal to the tester 300. In this case, the control terminal 200 transmits one of a self-test mode setting signal, a first test mode setting signal, and a second test mode setting signal to the tester 300. In this case, the self-test mode setting signal is a control signal for testing an operation of the tester 300 by using a signal that is output to and received from the tester 300 itself. The first test mode setting signal is a control signal for setting the mode of the tester 300 as a UWB test mode. The second test mode setting signal is a control signal for setting the mode of the tester 300 as a BLE test mode.

The control terminal 200 receives a performance measurement value from the tester 300, and stores and manages the performance measurement value. That is, the control terminal 200 stores at least one of a first communication performance measurement value and a second communication performance measurement value in association with unique information (e.g., a product number or a product name) of the test target terminal 10.

When the tester 300 operates in the first test mode, the control terminal 200 receives the first communication performance measurement value, that is, a UWB communication performance measurement value, from the tester 300. The first communication performance measurement value is received signal strength indication (RSSI) of a UWB signal that is measured by the tester 300, for example. The first communication performance measurement value may be a value in which a loss value of an RF cable (i.e., the first RF cable 40 and/or the second RF cable 50) has been incorporated into the RSSI of the UWB signal.

When the tester 300 operates in the second test mode, the control terminal 200 receives a second communication performance measurement value, that is, a BLE communication performance measurement value, from the tester 300. The second communication performance measurement value is a perform packet error rate (PER) of a BLE signal, for example. The second communication performance measurement value may further include RSSI and a transmission power level of a BLE signal that is measured by the tester 300. In this case, the second communication performance measurement value may be a value in which a loss value of an RF cable (i.e., the first RF cable 40 and/or the second RF cable 50) has been incorporated into the RSSI of the BLE signal.

The tester 300 operates in any one of the correction mode, the first test mode, and the second test mode. That is, the tester 300 operates in any one of the correction mode in which the tester 300 measures a loss of an RF cable in response to a request from the control terminal 200 and sets the measured loss as a correction value, the first test mode in which the tester 300 tests UWB communication performance, and the second test mode in which the tester 300 tests BLE communication performance.

Figure 2:
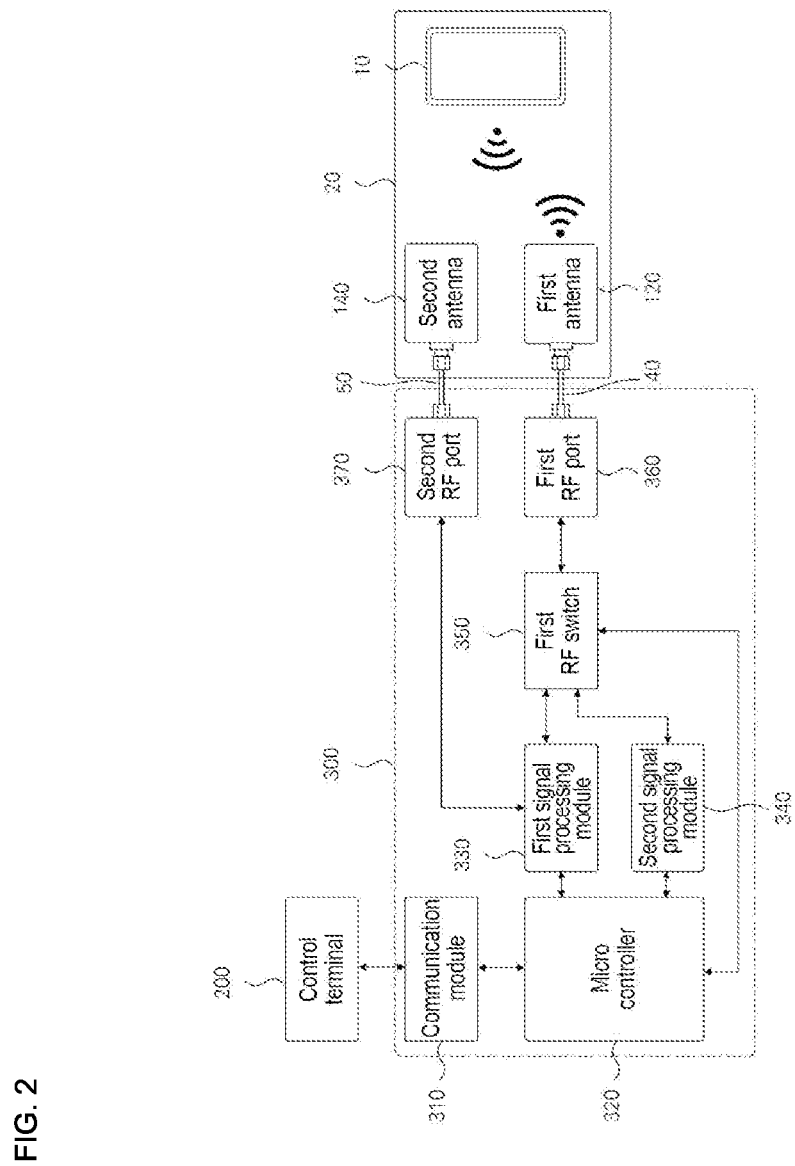
FIG. 2 is a diagram for describing a construction of a tester of FIG. 1.

Referring to FIG. 2, the tester 300 is constructed to include a communication module 310, a micro controller 320, a first signal processing module 330, a second signal processing module 340, a first RF switch 350, a first RF port 360, and a second RF port 370.

The communication module 310 is connected to the control terminal 200 so that data communication is possible. The communication module 310 may be connected to the control terminal 200 through a communication cable, such as a serial cable or a USB cable, or may be connected to the control terminal 200 over a network, such as the Internet or Intranet.

The micro controller 320 controls an operation of the tester 300. That is, the micro controller 320 controls the tester 300 to operate in one of the correction mode in which the tester 300 measures a loss of an RF cable in response to a request from the control terminal 200 and sets the measured loss as a correction value, the first test mode in which the tester 300 tests UWB communication performance, and the second test mode in which the tester 300 tests BLE communication performance.

The first signal processing module 330 operates only in the correction mode and the first test mode under the control of the micro controller 320. The first signal processing module 330 is a module that measures UWB communication performance, for example.

The second signal processing module 340 operates only in the second test mode under the control of the micro controller 320. The second signal processing module 340 is a module that measures BLE communication performance, for example.

The first RF switch 350 switches to one of the first signal processing module 330 and the second signal processing module 340 in response to a switching signal of the micro controller 320 so that the one signal processing module is connected to the first RF port 360. The first RF switch 350 switches to the first signal processing module 330 in response to a first switching signal of the micro controller 320, and forms a path between the first signal processing module 330 and the first RF port 360. The first RF switch 350 switches to the second signal processing module 340 in response to a second switching signal of the micro controller 320, and forms a path between the second signal processing module 340 and the first RF port 360.

A first end of the first RF port 360 is connected to the first RF switch 350. A second end of the first RF port 360 is connected to the first RF cable 40 or the second RF cable 50. Accordingly, the first RF port 360 is connected to the second RF port 370. The first RF port 360 outputs a correction signal that is output by the first signal processing module 330 to the second RF port 370 through the first RF cable 40 or the second RF cable 50.

The first RF port 360 may be connected to the first antenna 120 through the first RF cable 40. The first RF port 360 outputs a test signal that is output by the first signal processing module 330 or the second signal processing module 340 to the first antenna 120 through the first RF cable 40. The first RF port 360 receives a response signal that is received by the first antenna 120 from the test target terminal 10. The first RF port 360 outputs the received response signal to the first signal processing module 330 or the second signal processing module 340 through the first RF switch 350.

A first end of the second RF port 370 may be connected to the first signal processing module 330. A second end of the second RF port 370 is connected to the first RF cable 40 or the second RF cable 50. Accordingly, the second RF port 370 is connected to the first RF port 360. The second RF port 370 receives a correction signal that is output by the first RF port 360, and outputs the correction signal to the first signal processing module 330.

The second end of the second RF port 370 may be connected to the second antenna 140 through the second RF cable 50. The second RF port 370 receives a response signal that is received by the second antenna 140 from the test target terminal 10. The second RF port 370 outputs the received response signal to the first signal processing module 330 through the first RF switch 350.

Hereinafter, an operation of the tester 300 having a mode set as the correction mode is described.

The tester 300 operates in the correction mode in response to a correction mode setting signal of the control terminal 200. The tester 300 operates in the correction mode and sets a correction value, that is, loss values of the first RF cable 40 and the second RF cable 50. In this case, the tester 300 operates in the correction mode upon initial installation of the antenna performance test system, upon replacement of an RF cable, or at intervals of a set period.

Figure 3:
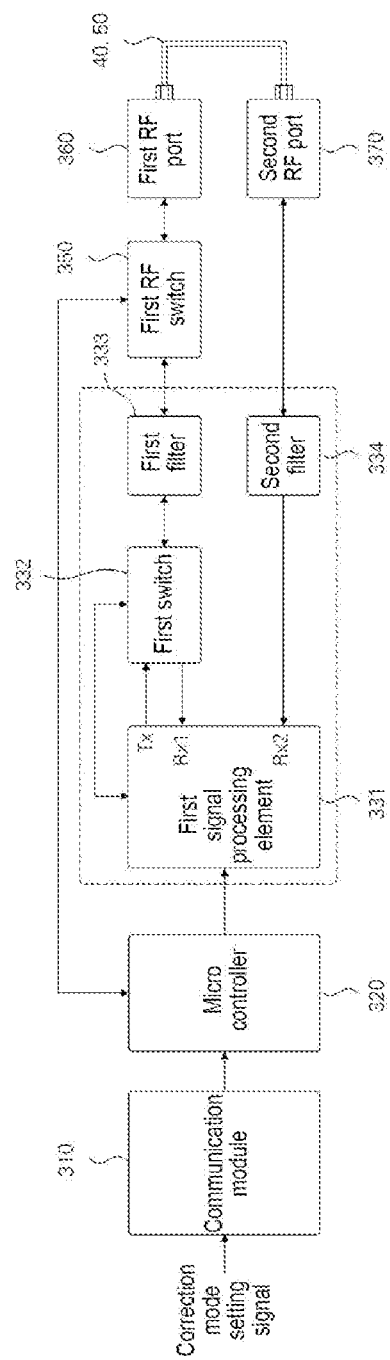
FIG. 3 is a diagram for describing the tester of FIG. 1 that operates in a correction mode.

Referring to FIG. 3, the signal processing module is constructed to include a first signal processing element 331, a first switch 332, a first filter 333, and a second filter 334 in order to operate in the correction mode.

The tester 300 operates in the correction mode in the state in which the first RF port 360 and the second RF port 370 have been connected by the first RF cable 40. The tester 300 may operate in a primary correction mode in the state in which the first RF cable 40 has been connected thereto, and may operate in a secondary correction mode in the state in which the second RF cable 50 has been connected thereto.

The communication module 310 transmits a correction mode setting signal to the micro controller 320 in response to a correction mode setting signal of the control terminal 200.

The micro controller 320 transmits a first switching signal to the first RF switch 350 in response to the correction mode setting signal of the communication module 310. The first RF switch 350 switches to the first signal processing module 330 in response to the first switching signal of the micro controller 320.

The micro controller 320 transmits a correction start signal to the first signal processing element 331. In this case, the correction start signal is UWB data, for example.

The first signal processing element 331 transmits a first switching signal to the first switch 332 in response to the correction start signal of the micro controller 320. The first switch 332 forms an output path between an output stage Tx of the first signal processing element 331 and the first filter 333 in response to the first switching signal of the first signal processing element 331.

When the output path is formed, the first signal processing element 331 outputs a correction signal, that is, a UWB signal, to the first switch 332. In this case, the first signal processing element 331 outputs the correction signal having reference signal strength.

The first switch 332 outputs the correction signal of the first signal processing element 331 to the first filter 333. The first filter 333 removes noise from the correction signal by filtering a signal having a UWB band, and then outputs the correction signal to the first RF port 360 through the first RF switch 350.

The first RF port 360 outputs the correction signal to the RF cable. The RF cable outputs the correction signal to the second RF port 370. The second RF port 370 outputs the correction signal received from the RF cable to the second filter 334. The second filter 334 removes noise from the correction signal by filtering a signal having a UWB band and then output the correction signal. The correction signal output by the second filter 334 is input to a second input stage Rx2 of the first signal processing element 331.

The first signal processing element 331 calculates a loss value of the first RF cable 40 by comparing reference signal strength of the correction signal that has been output to the output stage Tx and RSSI of the correction signal that has been input to the second input stage Rx2. That is, the first signal processing element 331 calculates the loss value of the first RF cable 40 by subtracting the RSSI from the reference signal strength.

Meanwhile, the tester 300 connects the second RF cable 50 to the first RF port 360 and the second RF port 370, and calculates a loss value of the second RF cable 50 by repeating the aforementioned process.

The first signal processing element 331 sets the calculated loss value of the first RF cable 40 as a first correction value, and sets the calculated loss value of the second RF cable 50 as a second correction value. In this case, the first signal processing element 331 may be in the state in which the reference signal strength has been stored in its internal memory in order to set the correction value.

The first signal processing element 331 may store the set first correction value and second correction value in the internal memory. The first signal processing element 331 may transmit the set first correction value and second correction value to the micro controller 320, and the micro controller 320 may store the first correction value and the second correction value.

Accordingly, the antenna performance test system according to an embodiment of the present disclosure can test UWB communication performance and BLE communication performance of the test target terminal 10 by using one tester 300.

Hereinafter, an operation of the tester 300 having a mode set as the first test mode is described.

Figure 4:
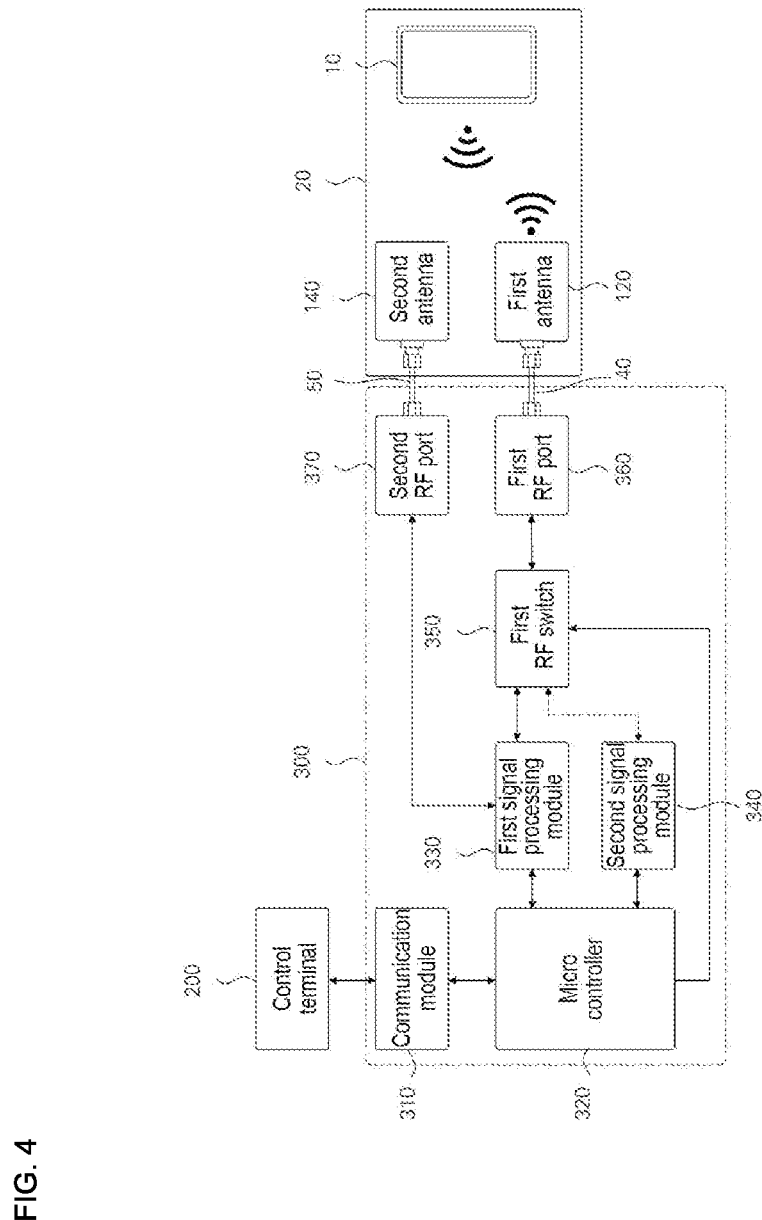
FIG. 4 is a diagram for describing the tester of FIG. 1 that operates in a UWB antenna test mode.

Referring to FIG. 4, the control terminal 200 transmits a first test mode setting signal to the tester 300 in order to measure UWB communication performance of the test target terminal 10.

The communication module 310 receives the first test mode setting signal of the control terminal 200 and outputs the first test mode setting signal to the micro controller 320. The micro controller 320 outputs a first switching signal to the first RF switch 350 in response to the first test mode setting signal. The first RF switch 350 forms a first test mode environment in which the first signal processing module 330 and the first antenna 120 and the second antenna 140 are connected by switching to the first signal processing module 330 in response to the first switching signal of the micro controller 320.

When the first test mode environment is formed, the first signal processing module 330 outputs a first test signal, that is, a signal having a UWB band, through the first antenna 120, and measures UWB communication performance of the test target terminal 10 by using a first response signal that is received from each of the first antenna 120 and the second antenna 140.

Figure 5:
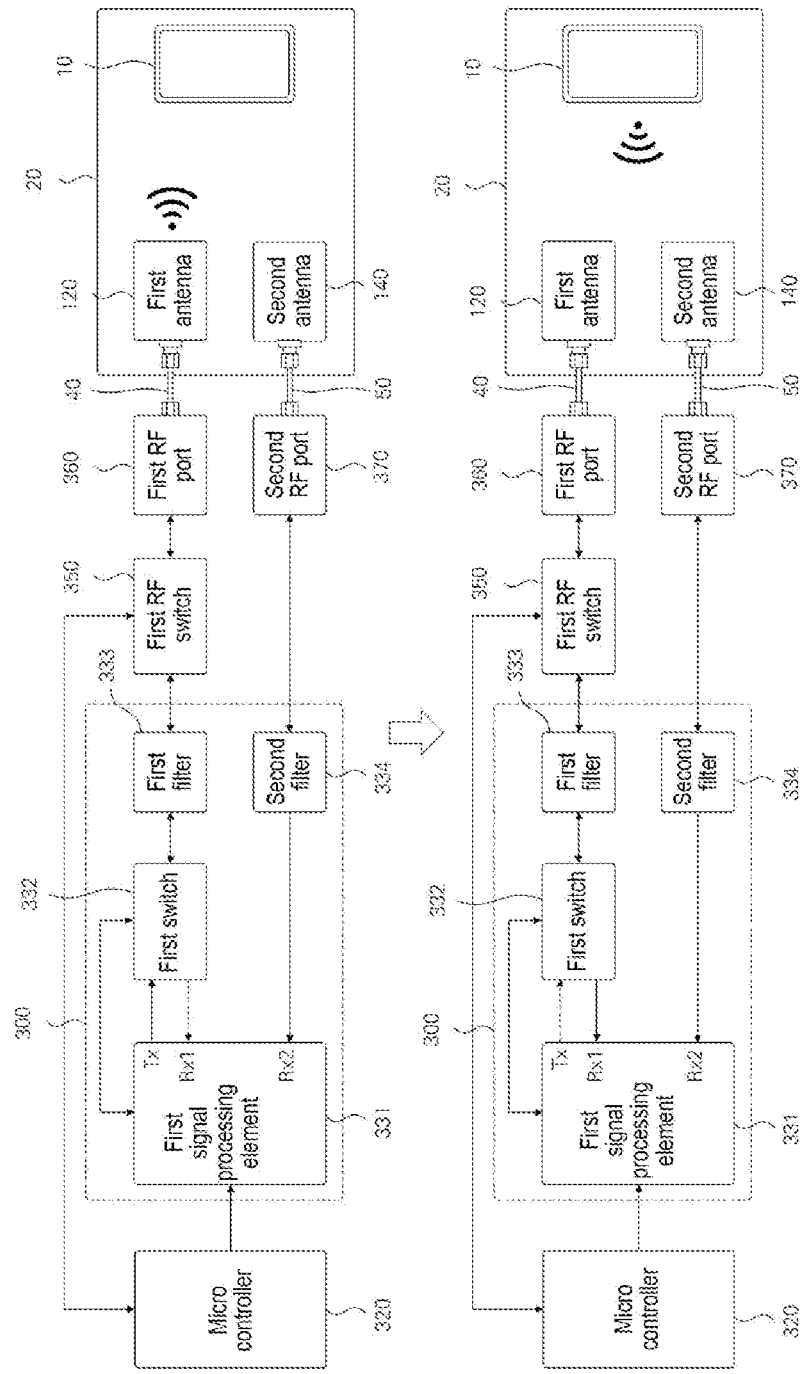
FIGS. 5 and 6 are diagrams for describing a construction of a first signal processing module that operates in the UWB antenna test mode.

Referring to FIG. 5, after transmitting a first switching signal, the micro controller 320 outputs a first test signal, that is, a signal having a UWB band, to the first signal processing element 331.

The first signal processing element 331 outputs a first switching signal to the first switch 332 in response to the first test signal of the micro controller 320. The first switch 332 forms a transmission path that connects the output stage Tx of the first signal processing element 331 and the first filter 333, in response to the first switching signal of the first signal processing element 331.

When the transmission path is formed, the first signal processing element 331 outputs a first test signal to the first filter 333 through the first switch 332. The first filter 333 removes noise from the first test signal by filtering a signal having a UWB band, and then outputs the first test signal to the first RF port 360 through the first RF switch 350.

The first RF port 360 outputs, to the first antenna 120, the first test signal that is input through the first filter 333 and the first RF switch 350. The first antenna 120 outputs the first test signal to the test target terminal 10 disposed within the shield box 20.

In this case, after the output of the first test signal is completed or after the test signal is output to the first switch 332, the first signal processing element 331 outputs a second switching signal to the first switch 332. The first switch 332 forms a reception path that connects a first input stage Rx1 of the first signal processing element 331 and the first filter 333 in response to the second switching signal.

The test target terminal 10 outputs a first response signal in response to the first test signal of the first antenna 120. The first antenna 120 and the second antenna 140 receive the first response signal output by the test target terminal 10.

The first antenna 120 outputs the first response signal to the first RF port 360. The first RF port 360 outputs a first response signal to the first filter 333 through the first RF switch 350 in response to the first response signal of the first antenna 120. The first filter 333 removes noise from the first response signal by filtering a signal having a UWB band in response to the first response signal of the first RF port 360, and then outputs the first response signal to the first switch 332. The first switch 332 outputs the first response signal to the first input stage Rx1 of the first signal processing element 331 in response to the first response signal of the first filter 333.

The second antenna 140 outputs the first response signal to the second RF port 370. The second RF port 370 outputs a first response signal to the second filter 334 in response to the first response signal of the second antenna 140. The second filter 334 removes noise from the first response signal by filtering a signal having a UWB band in response to the first response signal of the second RF port 370, and then outputs the first response signal to the second input stage Rx2 of the first signal processing element 331.

The first signal processing element 331 measures UWB communication performance by using the first response signals input to the first input stage Rx1 and the second input stage Rx2. The first signal processing element 331 generates a UWB communication performance measurement value by measuring UWB communication performance by using the two first response signals and an angle of arrival (AoA) method.

The first signal processing element 331 generates a first communication performance measurement value by incorporating a first correction value and a second correction value into the UWB communication performance measurement value. The first signal processing element 331 outputs the first communication performance measurement value to the micro controller 320.

The micro controller 320 generates a request for the transmission of the communication performance measurement value from the communication module 310, including the first communication performance measurement value, in response to the first communication performance measurement value of the first signal processing element 331. The micro controller 320 outputs the request for the transmission of the communication performance measurement value to the communication module 310. The communication module 310 transmits the first communication performance measurement value to the control terminal 200 in response to the request for the transmission of the communication performance measurement value, which has been received from the micro controller 320.

The first signal processing element 331 may have a limited signal range in which the signal may be processed. In this case, the signal range is a voltage range or current range of a signal which may be processed by all signal processing modules, for example.

Figure 6:
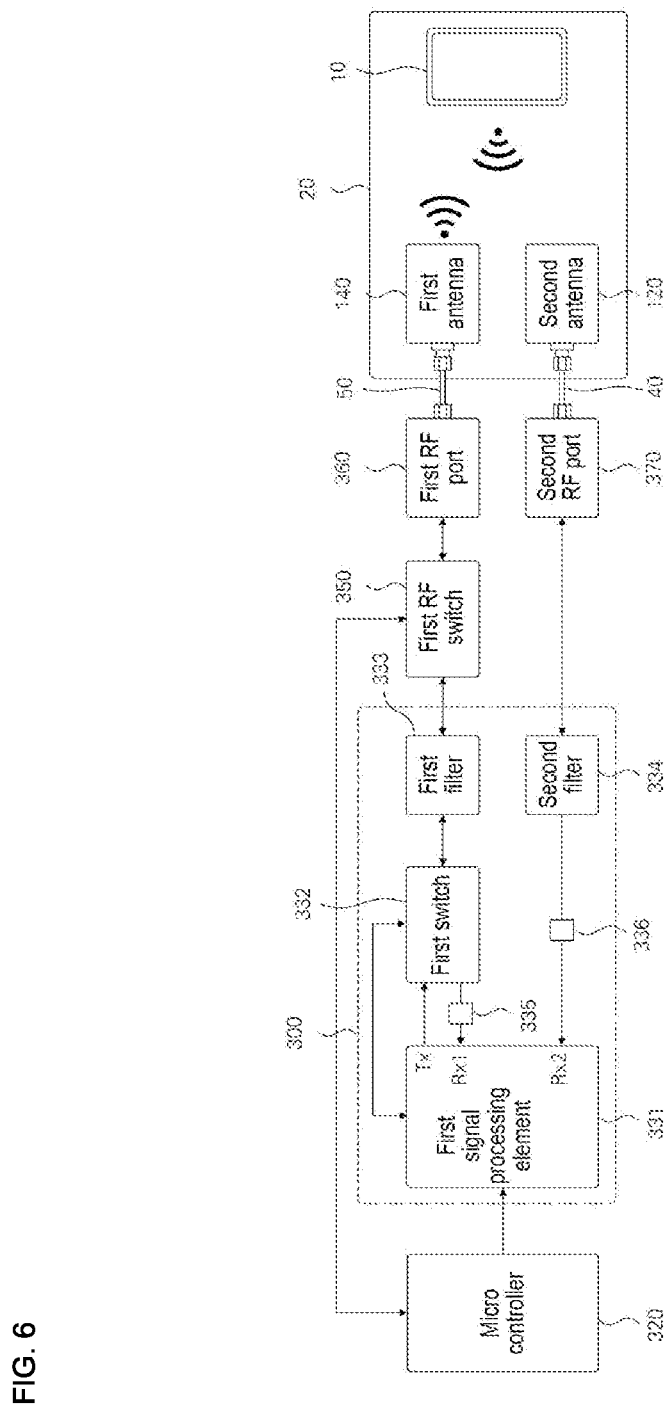

Accordingly, referring to FIG. 6, the first signal processing module 330 may further include a first attenuator 335 that is disposed between the first switch 332 and the first input stage Rx1 of the first signal processing element 331 and a second attenuator 336 that is disposed between the second filter 334 and the second input stage Rx2 of the first signal processing element 331.

The first attenuator 335 outputs, to the first input stage Rx1, the first response signal that is received through the first switch 332 by converting the first response signal into a signal included in the signal range of the first signal processing element 331. The second attenuator 336 outputs, to the second input stage Rx2, the first response signal that is received through the second filter 334 by converting the first response signal into a signal included in the signal range of the first signal processing element 331.

Meanwhile, an antenna performance test system may use three or more antennas in order to more accurately measure UWB communication performance of the test target terminal 10.

Figure 7:
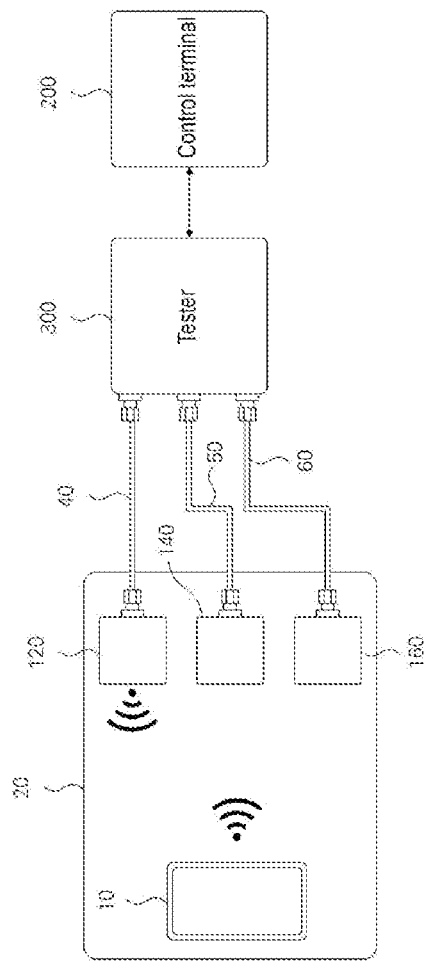
FIG. 7 is a diagram for describing a modified example of the system for testing performance of a UWB antenna and a BLE antenna according to an embodiment of the present disclosure.

For example, referring to FIG. 7, the antenna performance test system includes the first antenna 120, the second antenna 140, and a third antenna 160.

The tester 300 outputs a first test signal through the first antenna 120. The tester 300 receives a first response signal that is output by the test target terminal 10 through the first antenna 120, the second antenna 140, and the third antenna 160. The tester 300 measures UWB communication performance of the test target terminal 10 by using the first response signals that are received from the first antenna 120, the second antenna 140, and the third antenna 160 and an AoA determination method.

Figure 8:
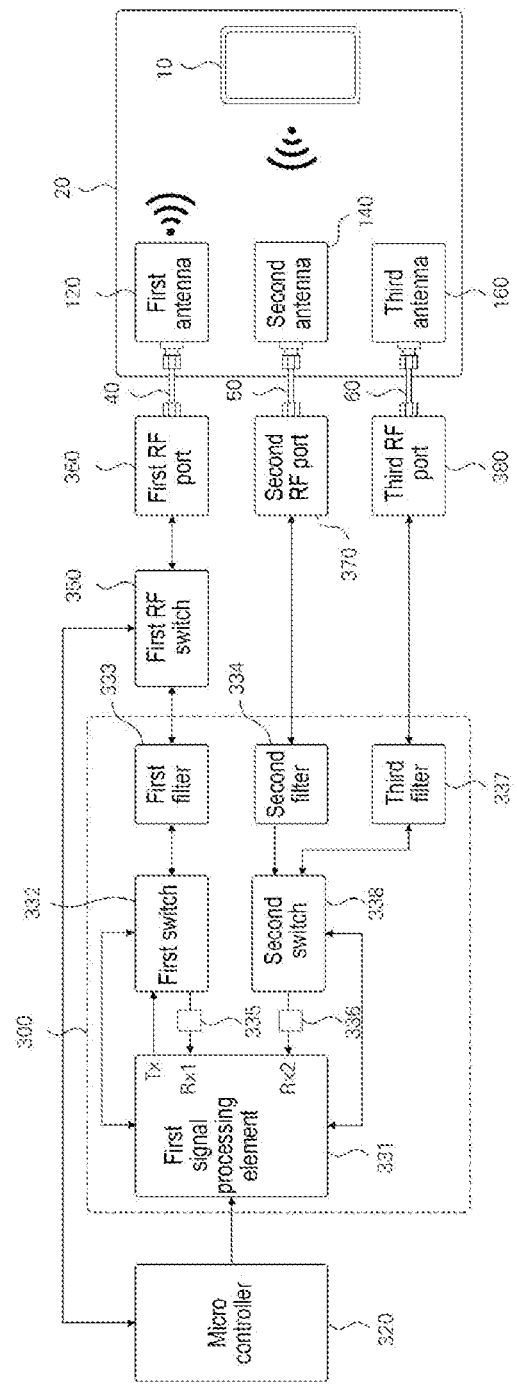
FIG. 8 is a diagram for describing a tester of FIG. 7 that operates in the UWB antenna test mode.

Referring to FIG. 8, the first signal processing element 331 outputs a first switching signal to the first switch 332 in response to the first test signal of the micro controller 320. The first switch 332 forms a transmission path that connects the output stage Tx of the first signal processing element 331 and the first filter 333, in response to the first switching signal of the first signal processing element 331.

When the transmission path is formed, the first signal processing element 331 outputs the first test signal to the first filter 333 through the first switch 332. The first filter 333 removes noise from the first test signal by filtering a signal having a UWB band, and then outputs the first test signal to the first RF port 360 through the first RF switch 350.

The first RF port 360 outputs, to the first antenna 120, the first test signal that is input through the first filter 333 and the first RF switch 350. The first antenna 120 outputs the first test signal to the test target terminal 10 disposed within the shield box 20.

In this case, after the output of the first test signal is completed or after the test signal is output to the first switch 332, the first signal processing element 331 outputs a second switching signal to the first switch 332. The first switch 332 forms a reception path that connects the first input stage Rx1 of the first signal processing element 331 and the first filter 333, in response to the second switching signal.

The test target terminal 10 outputs a first response signal in response to the first test signal of the first antenna 120. The first antenna 120, the second antenna 140, and the third antenna 160 receive the first response signal output by the test target terminal 10.

The first antenna 120 outputs a first response signal to the first RF port 360. The first RF port 360 outputs the first response signal to the first filter 333 through the first RF switch 350 in response to the first response signal of the first antenna 120. The first filter 333 removes noise from the first response signal by filtering a signal having a UWB band in response to the first response signal of the first RF port 360, and then outputs the first response signal to the first switch 332. The first switch 332 outputs the first response signal to the first input stage Rx1 of the first signal processing element 331 in response to the first response signal of the first filter 333.

When the output of the first test signal is completed or after the first test signal is output to the first switch 332, the first signal processing element 331 outputs a first switching signal to the second switch 338. The second switch 338 forms a reception path that connects the second input stage Rx2 and the second filter 334 in response to the first switching signal of the first signal processing element 331.

The second antenna 140 outputs a first response signal to the second RF port 370. The second RF port 370 outputs the first response signal to the second filter 334 in response to the first response signal of the second antenna 140. The second filter 334 removes noise from the first response signal by filtering a signal having a UWB band in response to the first response signal of the second RF port 370, and then outputs the first response signal to the second input stage Rx2 of the first signal processing element 331 through the second switch 338.

After the first response signal received from the second antenna 140 is received by the second input stage Rx2, the first signal processing element 331 outputs a second switching signal to the second switch 338. The second switch 338 forms a reception path that connects the second input stage Rx2 and the third filter 337 in response to the second switching signal of the first signal processing element 331.

The third antenna 160 is connected to the third RF port 380 through the third RF cable 60, and outputs a first response signal to the third RF port 380. The third RF port 380 outputs the first response signal to the third filter 337 in response to the first response signal of the third antenna 160. The third filter 337 removes noise from the first response signal by filtering a signal having a UWB band in response to the first response signal of the third RF port 380, and then outputs the first response signal to the second input stage Rx2 of the first signal processing element 331 through the second switch 338.

The first signal processing element 331 measures UWB communication performance by using the first response signals that have been input to the first input stage Rx1 and the second input stage Rx2. The first signal processing element 331 generates a UWB communication performance measurement value by measuring the UWB communication performance by using the three first response signals and the angle of arrival (AoA) method.

The first signal processing element 331 generates a first communication performance measurement value by incorporating a first correction value and a second correction value into the UWB communication performance measurement value. The first signal processing element 331 outputs the first communication performance measurement value to the micro controller 320.

The micro controller 320 generates a request for the transmission of the communication performance measurement value from the communication module 310, including the first communication performance measurement value, in response to the first communication performance measurement value of the first signal processing element 331. The micro controller 320 outputs the request for the transmission of the communication performance measurement value to the communication module 310. The communication module 310 transmits the first communication performance measurement value to the control terminal 200 in response to the request for the transmission of the communication performance measurement value, which has been received from the micro controller 320.

Meanwhile, the second attenuator 336 is disposed between the second input stage Rx2 of the first signal processing element 331 and the second switch 338. The second attenuator 336 outputs the first response signals that are input through the second filter 334 the third filter 337 to the second input stage Rx2 by converting the first response signals into a signal included in the signal range of the first signal processing element 331.

Hereinafter, an operation of the tester 300 having a mode set as the second test mode is described.

Figure 9:
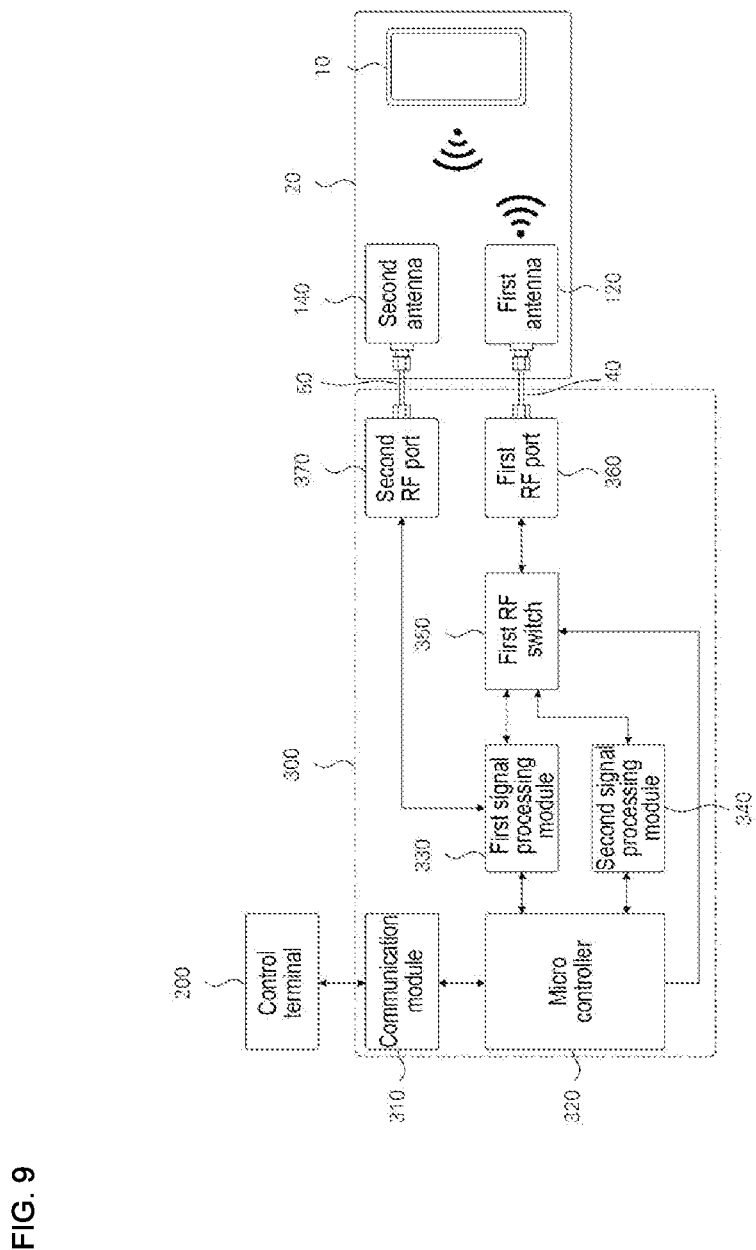
FIG. 9 is a diagram for describing the tester of FIG. 1 that operates in the BLE antenna test mode.

Referring to FIG. 9, the control terminal 200 transmits a second test mode setting signal to the tester 300 in order to measure BLE communication performance of the test target terminal 10.

The communication module 310 outputs the second test mode setting signal of the control terminal 200 to the micro controller 320 by receiving the second test mode setting signal. The micro controller 320 outputs a second switching signal to the first RF switch 350 in response to the second test mode setting signal. The first RF switch 350 forms a second test mode environment in which the second signal processing module 340 and the first antenna 120 are connected by switching to the second signal processing module 340 in response to the second switching signal of the micro controller 320.

When the second test mode environment is formed, the second signal processing module 340 outputs a second test signal, that is, a signal having a BLE band, through the first antenna 120, and measures BLE communication performance of the test target terminal 10 by using a second response signal that is received from the first antenna 120.

Figure 10:
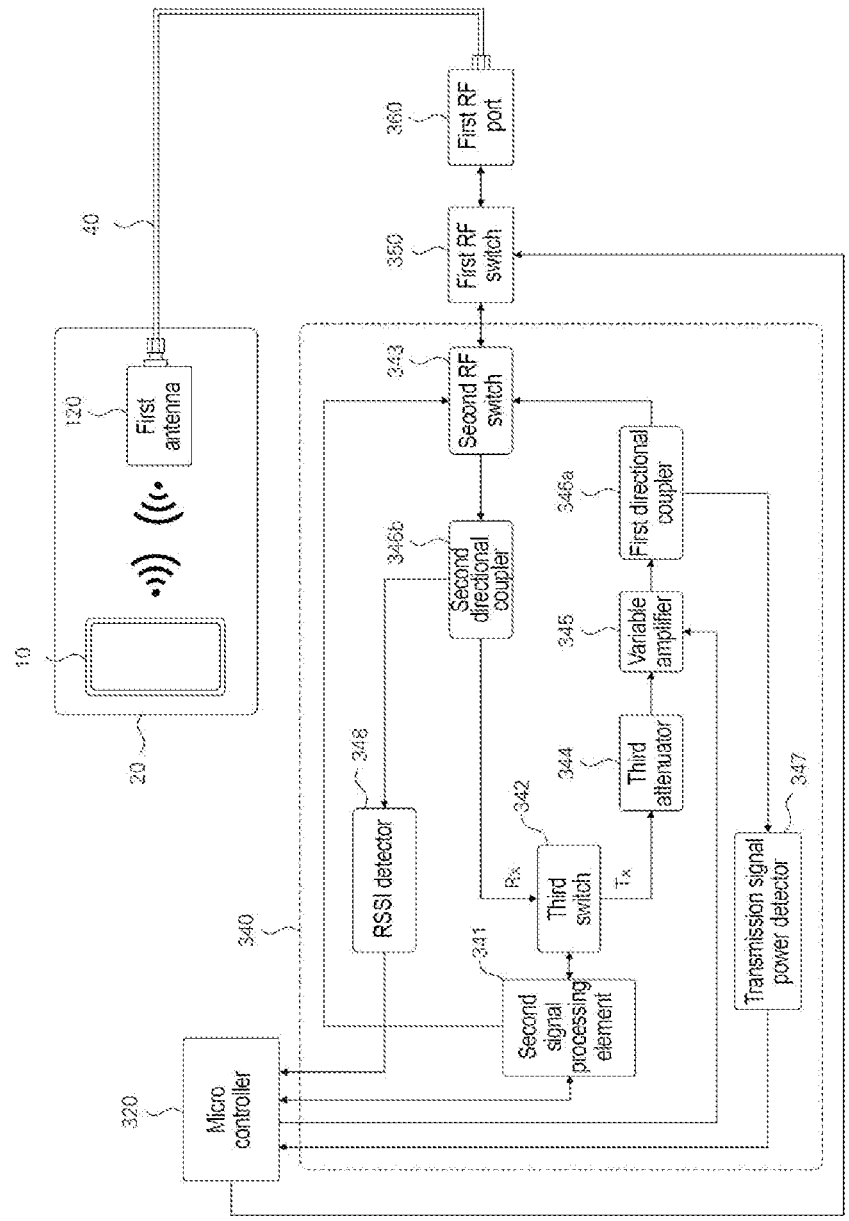
FIGS. 10 and 11 are diagrams for describing a construction of a second signal processing module of FIG. 9 that operates in the BLE antenna test mode.

Referring to FIG. 10, after transmitting the second switching signal, the micro controller 320 outputs the second test signal, that is, a signal having a BLE band, to the second signal processing element 341.

The second signal processing element 341 outputs a first switching signal to a third switch 342 and a second RF switch 343 in response to the second test signal of the micro controller 320.

The third switch 342 switches to the third attenuator 344 in response to the first switching signal of the second signal processing element 341. The second RF switch 343 switches to a first directional coupler 346a in response to the first switching signal of the second signal processing element 341. Accordingly, a transmission path that connects the third attenuator 344, the variable amplifier 345, and the first directional coupler 346a is formed.

When the transmission path is formed, the second signal processing element 341 outputs the second test signal to the third attenuator 344 through the third switch 342. The third attenuator 344 attenuates the power level (i.e., a voltage level or a current level) of the second test signal that is input through the third switch 342, and then outputs the second test signal to a variable amplifier 345.

The variable amplifier 345 outputs the second test signal output by the third attenuator 344 to the first directional coupler 346a by amplifying the power level of the second test signal. The first directional coupler 346a outputs the second test signal to the transmission signal power detector 347. The transmission signal power detector 347 detects the power level of the second test signal, and outputs the second test signal to the micro controller 320.

The micro controller 320 generates an amplification value for amplifying, by the variable amplifier 345, the second test signal into a signal having a set power level in response to the power level of the first directional coupler 346a. The micro controller 320 generates a power level control signal including the generated amplification value and outputs the power level control signal to the variable amplifier 345.

The variable amplifier 345 amplifies the level of the second test signal output by the third attenuator 344 as a power level corresponding to the amplification value in response to the power level control signal of the micro controller 320. The second test signal amplified by the variable amplifier 345 is output to the first directional coupler 346a. The first directional coupler 346a outputs the second test signal to the first RF port 360 through the second RF switch 343 and the first RF switch 350.

The first RF port 360 outputs the second test signal to the first antenna 120. The first antenna 120 outputs the second test signal to the test target terminal 10 disposed within the shield box 20.

Meanwhile, after the output of the second test signal is completed, the second signal processing element 341 outputs a second switching signal to the third switch 342 and the second RF switch 343. The third switch 342 and the second RF switch 343 switch to the second directional coupler 346b in response to the second switching signal of the second signal processing element 341. Accordingly, a reception path that connects the third switch 342, the second directional coupler, and the second RF switch 343 is formed.

The test target terminal 10 outputs a second response signal in response to the second test signal of the first antenna 120. The first antenna 120 receives the second response signal output by the test target terminal 10.

The first antenna 120 outputs the second response signal to the first RF port 360. The first RF port 360 outputs the second response signal to the second directional coupler 346b through the first RF switch 350 and the second RF switch 343 in response to the second response signal of the first antenna 120.

The second directional coupler 346b outputs the second response signal to an RSSI detector 348. The RSSI detector 348 detects RSSI of the second response signal and outputs the RSSI to the micro controller 320. Furthermore, the second directional coupler 346b outputs the second response signal to the second signal processing element 341 through the third switch 342.

The second signal processing element 341 measures a perform packet error rate (PER), that is, a criterion for BLE communication performance, by using the second response signal of the second directional coupler 346b. The second signal processing element 341 outputs the PER to the micro controller 320.

Accordingly, the antenna performance test system according to an embodiment of the present disclosure has an effect in that it can more accurately measure BLE communication performance because the antenna performance test system can measure the power level of a transmission signal and the sensitivity of a received signal along with the PER by connecting the directional couplers to the transmission path and the reception path, unlike in a conventional technology in which only PER performance of BLE communication is measured.

Figure 11:
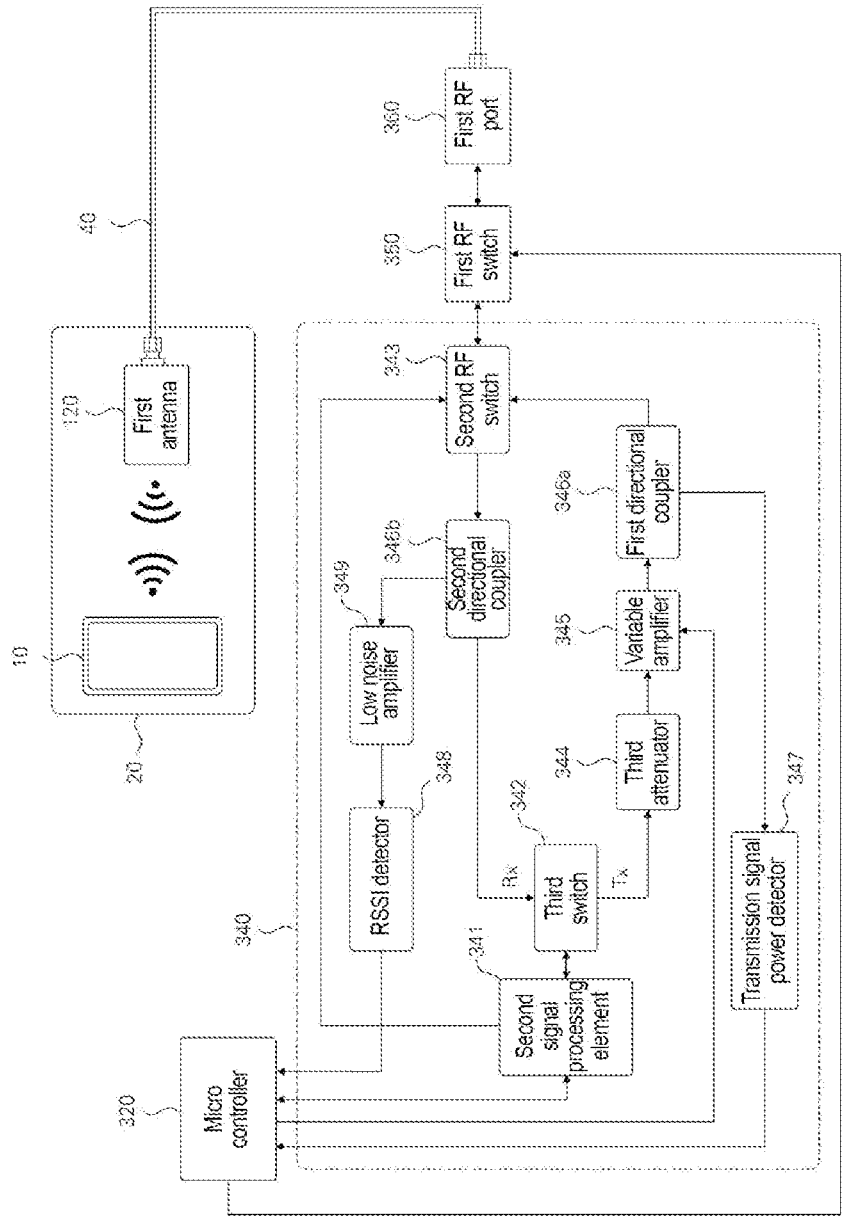

Meanwhile, referring to FIG. 11, the second signal processing module 340 may further include a low noise amplifier 349 that is disposed between the second directional coupler 346b and the RSSI detector 348. The low noise amplifier 349 amplifies the second response signal that is output to the second directional coupler 346b so that the RSSI detector 348 can more accurately measure RSSI of the second response signal.

Although the preferred exemplary embodiment according to the present disclosure has been described above, it is understood that changes may be made in various forms, and those skilled in the art may practice various changed examples and modified examples without departing from the claims of the present disclosure. [CLAIMS]

The invention claimed is:

1. An antenna performance test system, comprising:
a first antenna disposed within a shield box in which a test target terminal is disposed and configured to receive a response signal output by the test target terminal;
a second antenna disposed to be spaced apart from the first antenna within the shield box and configured to receive the response signal output by the test target terminal; and
a tester configured to generate a UWB communication performance measurement value of the test target terminal based on first response signals for a first test signal, which are received from the first antenna and the second antenna, after outputting the first test signal that is a UWB band signal to the first antenna in response to an input of a first test mode setting signal and to generates a BLE communication performance measurement value of the test target terminal based on a second response signal for a second test signal, which is received from the first antenna, after outputting the second test signal that is a BLE band signal to the first antenna in response to an input of a second test mode setting signal.

2. The antenna performance test system of claim 1, wherein the tester comprises:
a first RF port connected to the first antenna by a first RF cable;
a second RF port connected to the second antenna by a second RF cable;
a first signal processing module configured to output the first test signal to the first RF port in response to the input of the first test signal and then generate the UWB communication performance measurement value of the test target terminal based on the first response signal corresponding to the first test signal that is received from the first antenna and the first response signal corresponding to the first test signal that is received from the second antenna;
a second signal processing module configured to output the second test signal to the first RF port in response to the input of the second test mode setting signal and then generate the BLE communication performance measurement value of the test target terminal based on the second response signal corresponding to the second test signal that is received from the first antenna;
a first RF switch configured to have a first end switched to one of the first signal processing module and the second signal processing module, switch the first end to the first signal processing module in response to an input of a first switching signal, and switch the first end to the second signal processing module in response to an input of a second switching signal; and
a micro controller configured to output the first test signal to the first signal processing module after outputting the first switching signal to the first RF switch in response to the input of the first test mode setting signal and to output the second test signal to the second signal processing module after outputting the second switching signal to the first RF switch in response to the input of the second test mode setting signal.

3. The antenna performance test system of claim 2, wherein the first signal processing module comprises:
a first signal processing element configured to output the first test signal to an output stage thereof after outputting the first switching signal in response to the input of the first test signal and to generate the UWB performance measurement value of the test target terminal based on the first response signals corresponding to the first test signal, which are input to a first input stage and a second input stage thereof, after outputting the second switching signal in response to the output of the first test signal; and
a first switch configured to have a first end connected to one of the output stage and the first input stage, to form a transmission line connected to the first RF switch by switching to the output stage in response to the first switching signal of the first signal processing element, and to form a first reception line connected to the first RF switch by switching to the first input stage in response to the second switching signal of the first signal processing element,
wherein the first signal processing element is configured to form a second reception line that is connected to the second input stage and the second RF port.

4. The antenna performance test system of claim 3, wherein the first signal processing module further comprises:

a first filter connected to a second end of the first switch and configured to output the first test signal to the first RF port through the first RF switch in response to the input of the first test signal through the first switch, to receive the first response signal corresponding to the first test signal from the first RF port through the first RF switch, and to output the first response signal to the first input stage through the first switch; and a second filter configured to receive the first response signal corresponding to the first test signal from the second RF port and to output the first response signal to the second input stage.

5. The antenna performance test system of claim 4, wherein the first signal processing module further comprises:
   a first attenuator disposed between the first input stage of the first signal processing element and the first switch and configured to output the first response signal input through the first switch to the first input stage by attenuating the first response signal; and
   a second attenuator disposed between the second input stage of the first signal processing element and the second filter and configured to output the first response signal input through the second filter to the second input stage by attenuating the first response signal.

6. The antenna performance test system of claim 4, further comprising a third antenna disposed to be spaced apart from the first antenna and the second antenna within the shield box and configured to receive the response signal output by the test target terminal,
   wherein the tester further comprises:
   a third RF port connected to the third antenna through a third RF cable;
   a third filter configured to receive the first response signal corresponding to the first test signal from the third RF port; and
   a second switch configured to have a first end connected to the second input stage and configured to form a first reception line configured to receive the first response signal input to the second RF port by switching to the second filter when receiving the first switching signal of the first signal processing element and to form a second reception line that receives the first response signal input to the third RF port by switching to the third filter when receiving the second switching signal of the first signal processing element.

7. The antenna performance test system of claim 6, wherein the first signal processing element is configured to output the first switching signal to the second switch in response to the output of the first test signal and to output the second switching signal to the second switch after receiving the first response signal received from the second antenna.

8. The antenna performance test system of claim 6, wherein the first signal processing module further comprises:
   a first attenuator disposed between the first input stage of the first signal processing element and the first switch and configured to output the first response signal input through the first switch to the first input stage by attenuating the first response signal; and
   a second attenuator disposed between the second input stage of the first signal processing element and the second switch and configured to output the first response signal input through one of the second filter and the third filter to the second input stage by attenuating the first response signal.

9. The antenna performance test system of claim 2, wherein the second signal processing module comprises:
   a second signal processing element configured to output the second test signal after outputting the first switching signal in response to the input of the second test signal, to output the second switching signal in response to the output of the first test signal, and to generate a BLE performance measurement value of the test target terminal based on the second test signal and the second response signal corresponding to the second test signal;
   a third switch configured to have a first end connected to the second signal processing element, to have a second end switched to a transmission line in response to the first switching signal of the second signal processing element, and to switch the second end to a reception line in response to the second switching signal of the second signal processing element; and
   a second RF switch configured to have a first end connected to the first RF switch, to form a transmission line along with the third switch in response to the first switching signal of the second signal processing element, and to form a reception line along with the third switch in response to the second switching signal of the second signal processing element.

10. The antenna performance test system of claim 9, wherein:
    the first test signal is output to the first RF port through the transmission line formed by the third switch and the second RF switch, the second RF switch, and the first RF switch, and
    the second response signal received from the first RF port is input to the second signal processing element through the first RF switch, the second RF switch, and the reception line.

11. The antenna performance test system of claim 9, wherein the second signal processing module comprises:
    a third attenuator disposed on the transmission line and configured to have a first end connected to the third switch and to output the second test signal that has been output by the third switch by attenuating a power level of the second test signal;
    a variable amplifier disposed on the transmission line and configured to have a first end connected to a second end of the third attenuator and to output the second test signal that has been output by the third attenuator by amplifying a power level of the second test signal; and
    a first directional coupler disposed on the transmission line and configured to have a first end connected to a second end of the variable amplifier and to output the second test signal that has been output by the variable amplifier by dividing the second test signal into two paths.

12. The antenna performance test system of claim 11, wherein the second signal processing module further comprises a first directional coupler configured to measure a power level of the second test signal that has been output by the first directional coupler and to output the power level of the second test signal to the micro controller.

13. The antenna performance test system of claim 12, wherein:
    the micro controller is configured to set an amplification value of the second test signal based on the power level of the second test signal that has been output by the first directional coupler and to output a power level control signal comprising the amplification value to the variable amplifier, and the variable amplifier is configured to output the second test signal that has been output by the third attenuator by amplifying a level of the second test signal to a power level corresponding to the amplification value in response to the power level control signal.

14. The antenna performance test system of claim 9, wherein the second signal processing module comprises a second directional coupler disposed on the transmission line and configured to have a first end connected to the second RF switch and to output the second response signal that has been output by the second RF switch by dividing the second response signal into two paths.

15. The antenna performance test system of claim 14, wherein the second signal processing module further comprises an RSSI detector configured to detect RSSI of the second response signal that has been output by the second directional coupler and to output the RSSI of the second response signal to the micro controller.

16. The antenna performance test system of claim 15, wherein the second signal processing module further comprises a low noise amplifier connected to the second directional coupler and the RSSI detector and configured to output the second response signal that has been output by the second directional coupler to the RSSI detector by amplifying the second response signal.

* * * * *